United States Patent [19]

Murakami

[11] Patent Number: 5,543,878
[45] Date of Patent: Aug. 6, 1996

[54] FILM FEED DEVICE WITH FILM VELOCITY DETECTOR AND DECELERATION AND BRAKING CONTROL

[75] Inventor: Hiroshi Murakami, Kawasaki, Japan

[73] Assignee: Nikon Corporation, Tokyo, Japan

[21] Appl. No.: 417,468

[22] Filed: Apr. 5, 1995

Related U.S. Application Data

[63] Continuation of Ser. No. 105,179, Aug. 12, 1993, abandoned.

[30] Foreign Application Priority Data

Aug. 21, 1992 [JP] Japan .................................. 4-222327

[51] Int. Cl.⁶ .................................................. G03B 1/12
[52] U.S. Cl. ................................................... 354/173.1
[58] Field of Search ........................... 354/173.1, 173.11, 354/484

[56] References Cited

U.S. PATENT DOCUMENTS 4,734,732  3/1988  Nishio et al. ..................... 354/173.11
5,057,859  10/1991  Ishimaru ......................... 354/173.1 X
5,210,562  5/1993  Miyazawa et al. ............... 354/173.1 X
5,239,331  8/1993  Kobe et al. ....................... 354/173.1 X

FOREIGN PATENT DOCUMENTS

| 58-24124 | 2/1983 | Japan . |
| 58-24123 | 2/1983 | Japan . |
| 62-73246 | 4/1987 | Japan . |
| 62-251732 | 11/1987 | Japan . |
| 63-130751 | 8/1988 | Japan . |
| 4-69635 | 3/1992 | Japan . |
| 4-69636 | 3/1992 | Japan . |
| 4-69637 | 3/1992 | Japan . |

*Primary Examiner*—Russell E. Adams
*Assistant Examiner*—J. K. Han

[57] ABSTRACT

A film feed device comprises motor for feeding a film, a power supply battery for supplying a voltage to the motor, a velocity detection unit for detecting a film feed velocity, a deceleration unit for duty-driving the motor, a reverse drive brake unit for reversely driving the motor to stop the film feed, and a control unit for controlling the deceleration unit and the reverse drive brake unit based on the film feed velocity detected by the velocity detection unit.

7 Claims, 5 Drawing Sheets

FILM FEED DEVICE WITH FILM VELOCITY DETECTOR AND DECELERATION AND BRAKING CONTROL

This is a continuation of application Ser. No. 08/105,179, filed Aug. 12, 1993, now abandoned.

BACKGROUND OF THE INVENTION

1. Field of the Invention

The present invention relates to a film feed device which feeds a film by using a motor as a drive source.

2. Related Background Art

FIG. 1 shows a construction of a film wind-up unit.

A drive force of a motor 1 is transmitted to a spool 4 which is in union with a gear 3 through gears 2 to rotate the spool 4.

The spool 4 is a member to wind up the taken-up film and the film is wound up on the spool 4 by the drive of the motor 1.

The film rotates a sprocket 9 while it is taken up.

The rotation of the sprocket 9 causes the rotation of a disk 7 which rotates with a gear 6 through the gears 5. A plurality of grooves 7a are formed in the disk 7 at a constant pitch, and a photo-interrupter 8 detects the grooves 7a and outputs a pulse signal for each unit of movement. The rotation of the disk 7 is detected by this output signal.

Since the rotation of the disk 7 is linked to the rotation of the sprocket 9, a feed velocity of the film is detected by detecting the rotation speed of the disk 7.

When the film is fed, since the taken-up film is wound on the spool 4, a diameter of the spool 4 when the 35th or 36th frame of the film is wound is greater than that when the first or second frame is wound. Assuming that the rotating speed of the spool 4 is constant without regard to the number of frames of the film, the wind-up speed (feed velocity) is larger when the diameter is greater.

Further, when a voltage of a power supply battery for driving the motor drops, the rotation speed of the motor, that is the feed velocity of the film decreases accordingly. As a result, the film feed velocity changes between when a new battery is used and when an old battery is used, or between when the camera is used at a high temperature and when the camera is used at a low temperature.

Accordingly, the amount of feed of the film is not constant because the feed velocity of the film is not constant.

In the light of the above, it is required in the film feed device to shorten the feed time by quickly feeding the film and stopping it at a constant position.

In a prior art film feed device, the following method has been proposed to stop the feed of the film.

In a first method, a duty factor (a ratio of a film feed velocity before the duty drive and a film feed velocity after the drive) of the duty feed for reducing the feed velocity ( moving velocity ) of the film is varied so that the feed velocity of the film at the time of start of short braking to stop the motor is always constant.

FIG. 2 shows a chart of a relationship between the film feed velocity and the film feed amount in the film feed device. In FIG. 2, Sd-Ss represents a duty drive section, and Ss-Se denotes a short brake section. A graph a represents a relation between the film feed velocity and the film feed amount when the film is stopped from a high speed feed status, and graph b represents a relation between the film feed velocity and the film feed amount when the film is stopped from a low speed feed status. In the graph a, a duty factor in the duty drive section is rendered large to rapidly decelerate between the film feed velocities Va and Vs while in the graph b the duty factor in the duty drive section is rendered small to slowly decelerate between the film feed velocities Vb and Vs.

In this manner the film feed velocity after the duty drive is rendered constant (Vs) and then the short brake is applied.

However, in this method, when the feed velocity is high, the duty drive time is long and hence the film feed time is long. Further, since the motor is stopped by the short brake, the overrun amount (a distance of film movement to the complete stop of the motor after the application of the brake Ss-Se) is large and the variation is large because of the inertia of the motor and the gears and the friction. A second method to stop the film is now explained.

In the second method, the time at which the brake is applied to the feed motor is changed in accordance with the film feed velocity and the motor is stopped by the short brake so that the film is always stopped at the constant position.

FIG. 3 shows a chart of a relation between the film feed velocity and the film feed amount in the present film feed device.

A graph a represents a relation between the film feed velocity and the film feed amount when the film is stopped from the high speed feed status, and a graph b shows a relation between the film feed velocity and the film feed amount when the film is stopped from the low speed feed status. In the graph a, the short brake is applied at a film displacement point Ssa while in the graph b the short brake is applied at the film displacement point Ssb which is larger than that of the graph a. In this case, since the higher the feed velocity is, the longer is the short brake applied and hence the larger is the overrun amount. Further, the variance is larger due to the inertia of the motor and the gears and the friction.

SUMMARY OF THE INVENTION

It is an object of the present invention to provide a film feed device which shortens the film feed time and stops the film always at a constant position.

In order to achieve the above object, the film feed device of the present invention which feeds a film by a motor powered by a battery power supply comprises a deceleration control unit for controlling the deceleration of a film feed a reverse drive brake unit for stopping the film feed by reversely driving the motor, a velocity detection unit for detecting the film feed velocity, and a brake control unit for controlling the deceleration control unit and the reverse drive brake control unit in accordance with the output of the velocity detection unit.

The reverse drive brake is a means for rapidly braking the motor by reversing a current flowing in the motor. As a result, the motor is stopped in a shorter time than that required by the short brake and the overrun amount is smaller.

DETAILED DESCRIPTION OF THE PREFERRED EMBODIMENTS

FIGS. 4 to 9 show an embodiment of the present invention.

Figure 4:
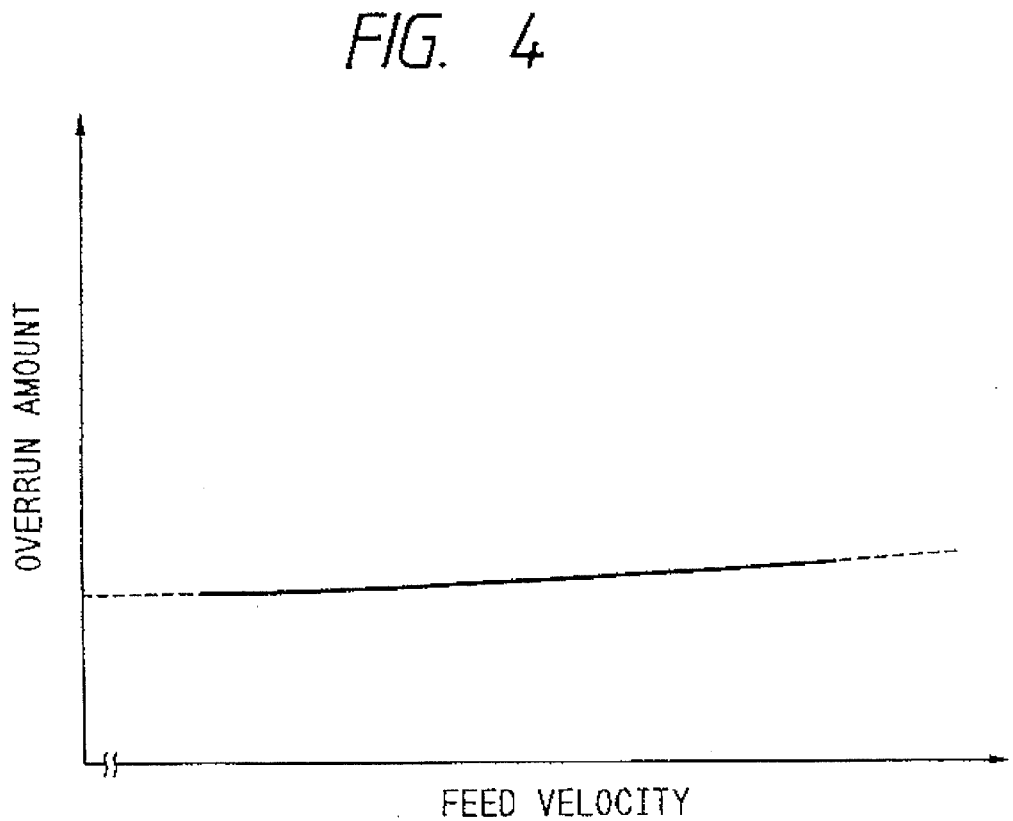
FIG. 4 shows a chart of a relation between a film feed velocity and an overrun amount at a low velocity.
Figure 5:
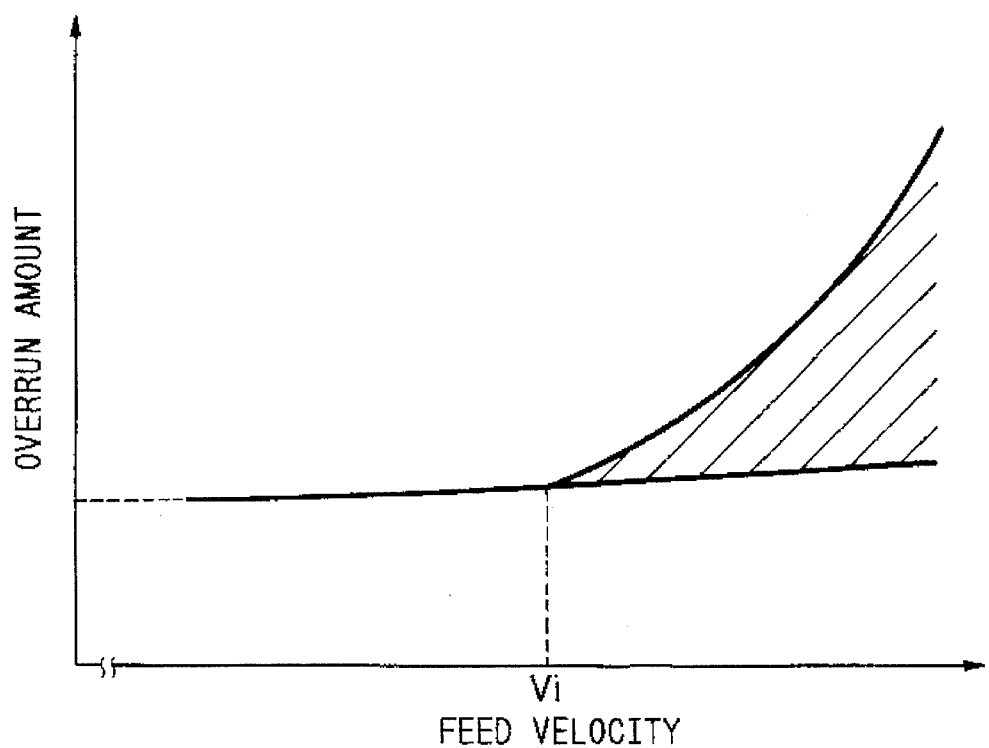
FIG. 5 shows a chart of a relation between the film feed velocity and the overrun amount at a high velocity.
Figure 6:
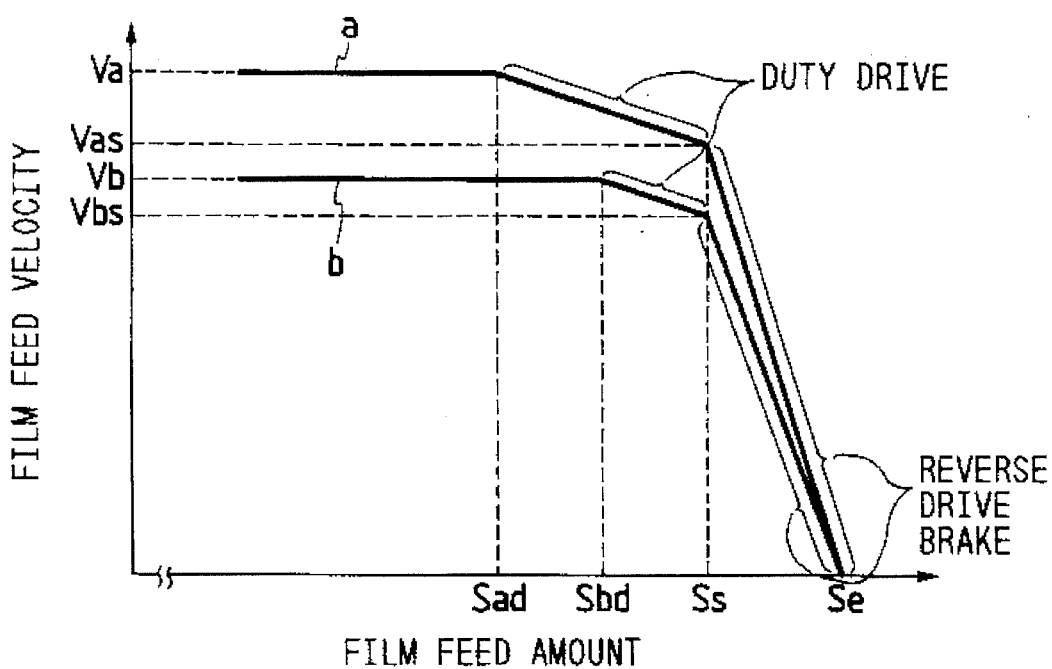
FIG. 6 shows a chart of a relation between the film feed amount and the film feed velocity when the film is fed in an embodiment of the present invention.
Figure 7:
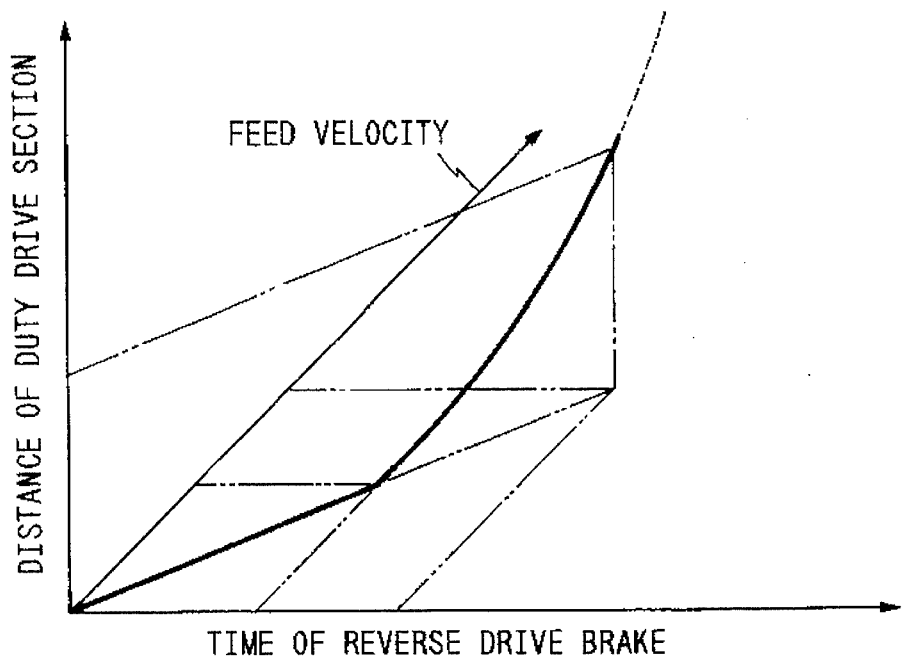
FIG. 7 shows a chart of a relation among a reverse drive brake time, a duty drive distance and a feed velocity.
Figure 8:
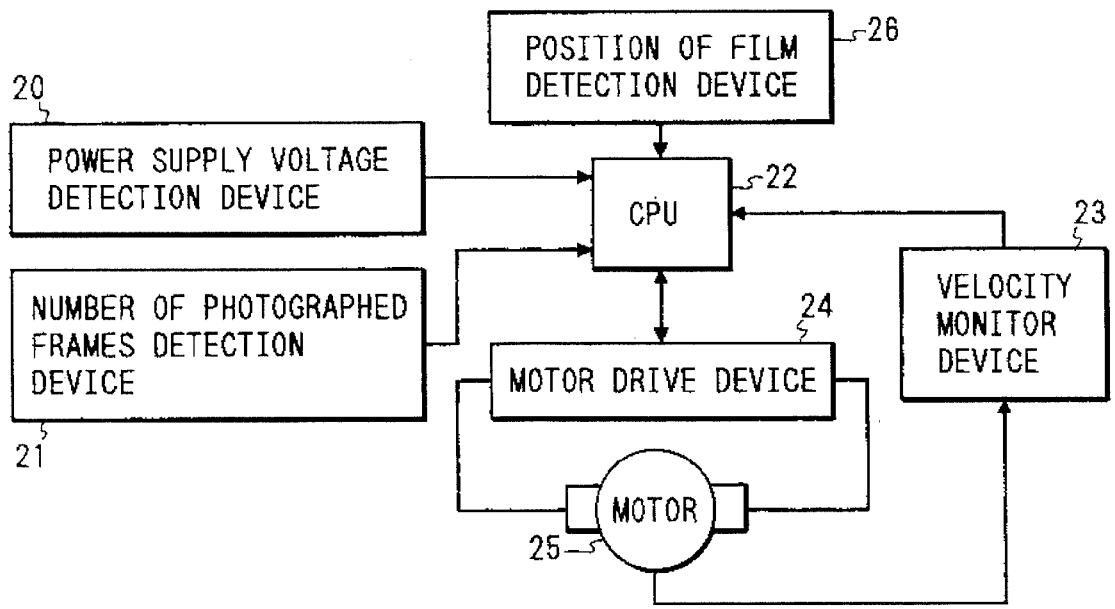
FIG. 8 shows a block diagram of an electric circuit in the film feed device of the embodiment of the present invention.
Figure 9:
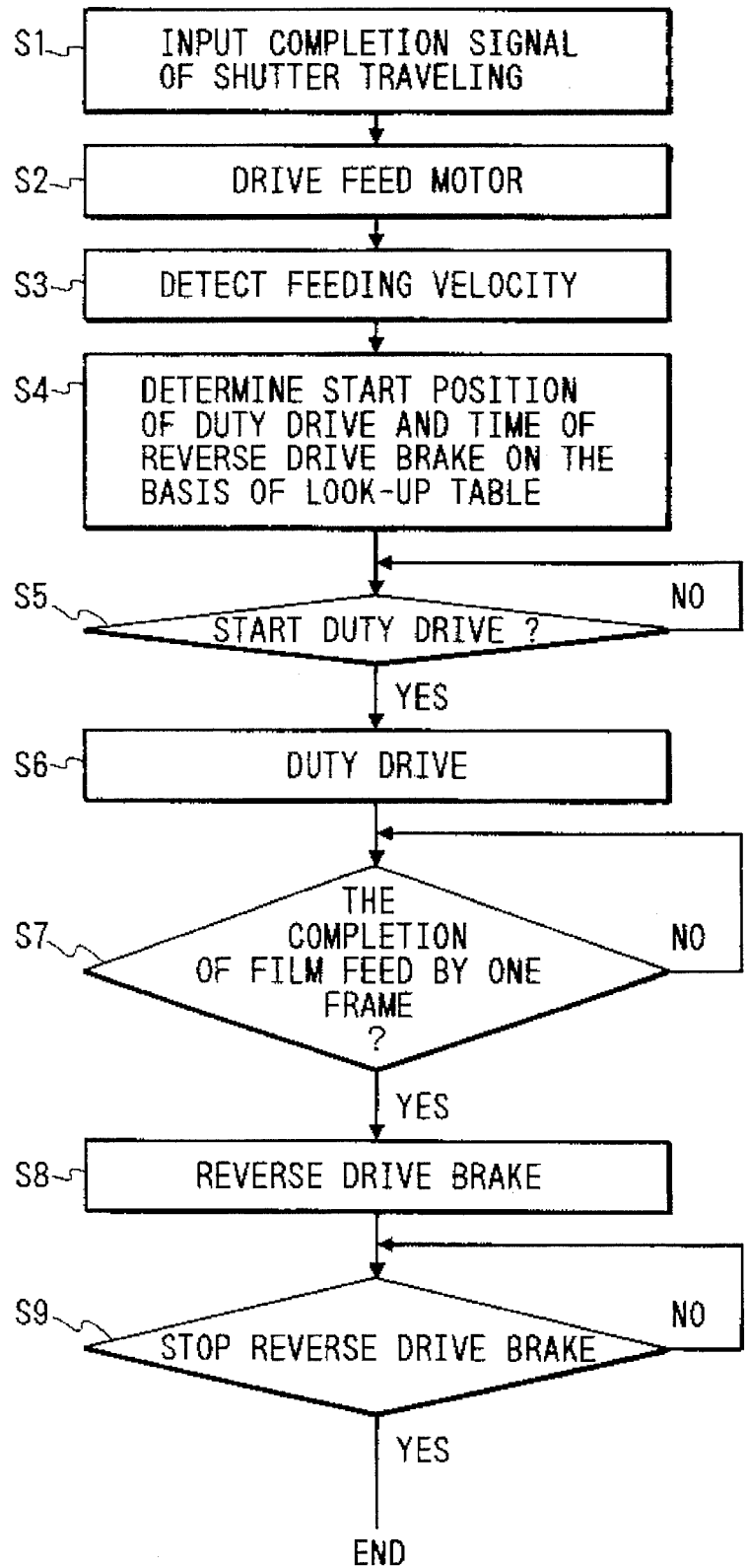
FIG. 9 shows a flow chart of an operation of a CPU.

FIG. 4 shows a chart of a relation between the film feed velocity and the overrun amount when the film feed (at a low velocity) is stopped by the reverse drive brake. FIG. 5 shows a chart of a relation between the film feed velocity and the overrun amount when the film feed (at a high velocity) is stopped by the reverse drive brake. FIG. 6 shows a chart of a relation between the film feed amount and the film feed velocity when the film feed is stopped by the duty drive and the reverse drive brake. FIG. 7 shows a chart of a relation among the duty drive distance, the reverse drive brake time and the feed velocity. FIG. 8 shows a block diagram of a circuit in the film feed device. FIG. 9 shows a flow chart showing an operation of a CPU in FIG. 8.

Figure 1:
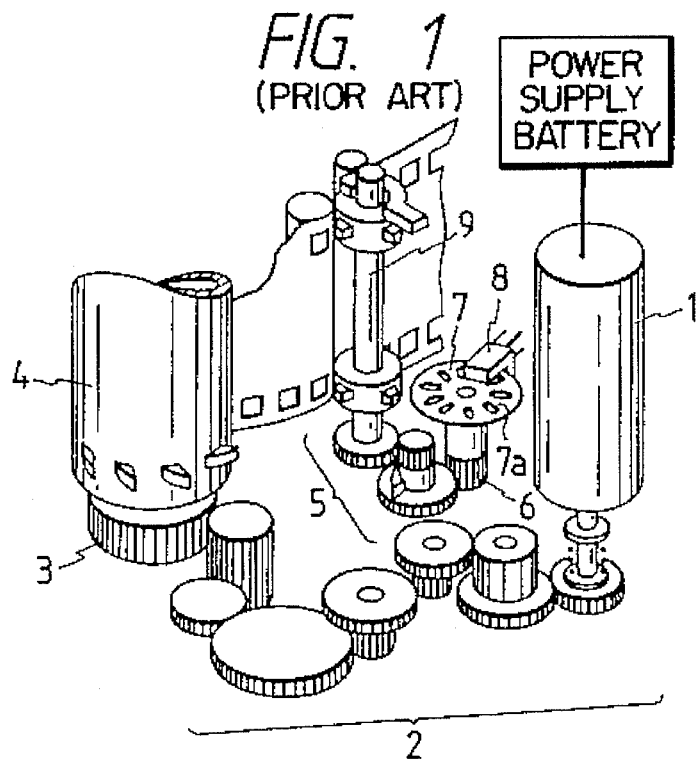
FIG. 1 shows a drive mechanism of a film feed device.
Figure 2:
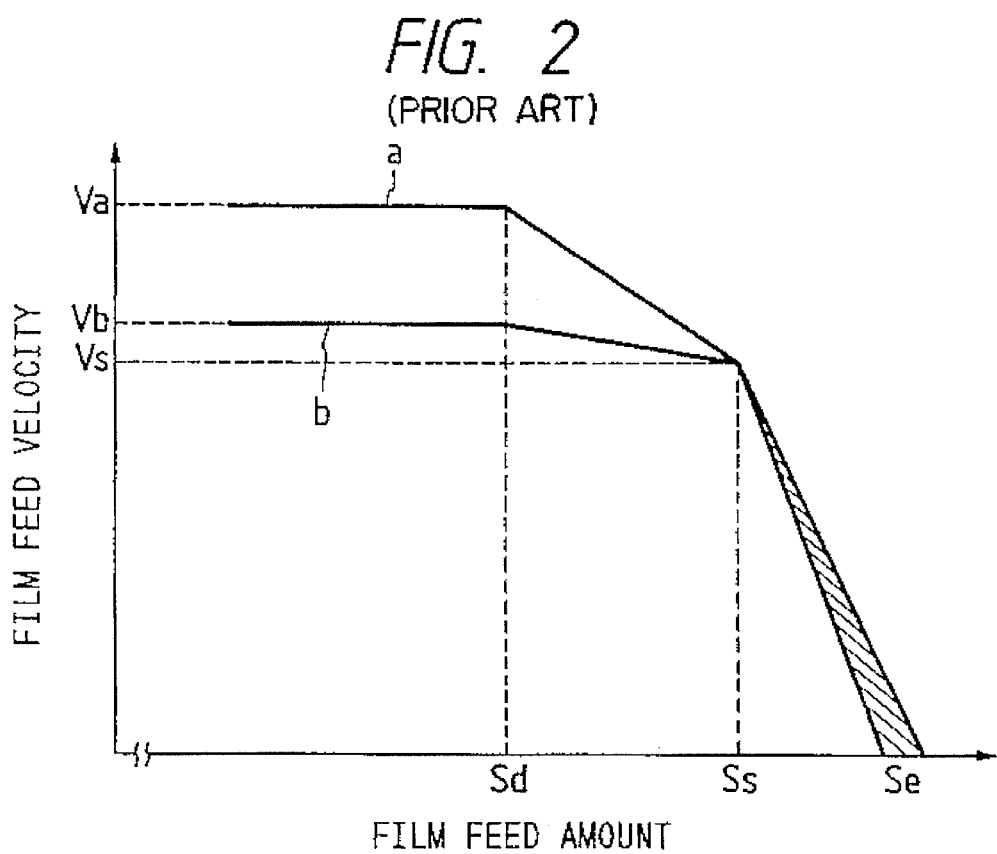
FIG. 2 shows a method for controlling the braking in a prior art film feed device.
Figure 3:
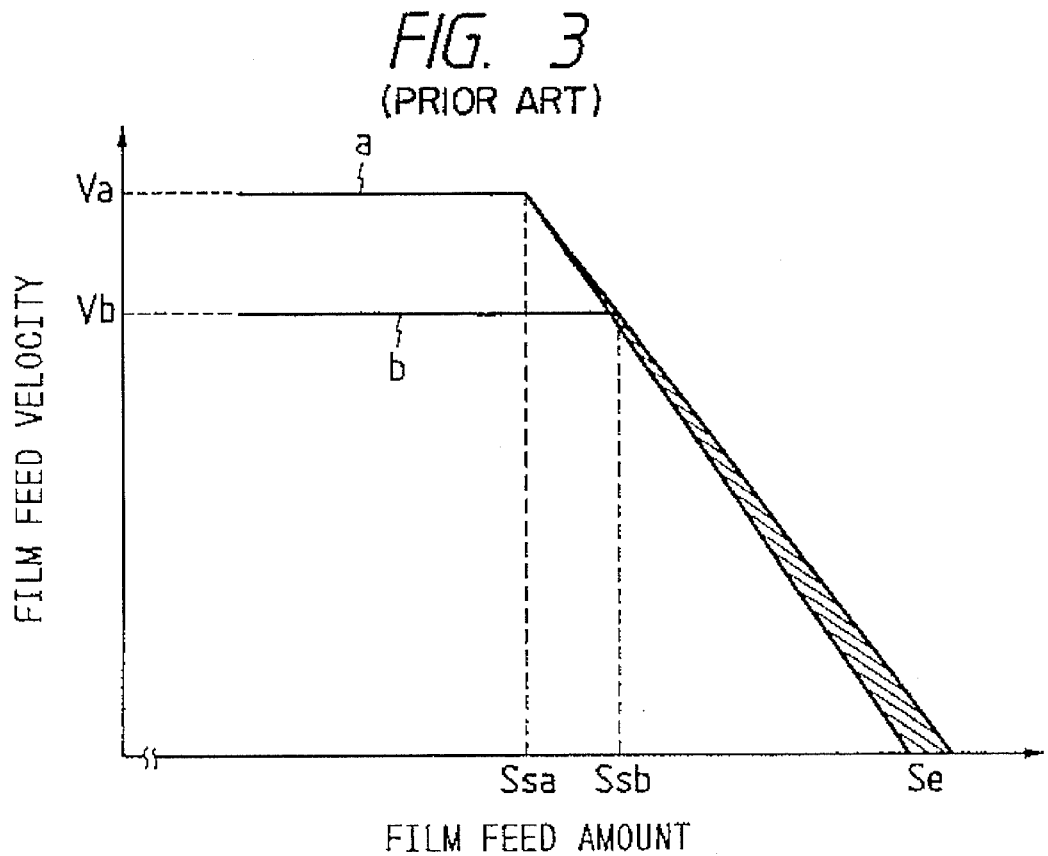
FIG. 3 shows a method for controlling the braking in a prior art film feed device.

The physical construction of the film feed device of the present embodiment is identical to that of the prior art film feed device (see FIG. 1) and the explanation thereof is omitted.

A first embodiment of the present invention is now explained.

The reverse drive brake stops the motor by applying a potential which is reverse to a drive power across the terminals of the motor being driven forwardly to cause a reverse rotating force to that of the forward drive.

The drive force of the motor is substantially determined by a voltage of a power supply battery which supplies a power to the motor. Similarly, a reverse drive force is also substantially determined by the voltage of the power supply battery.

Thus, when the motor is to be stopped by the reverse drive force, the reverse braking time from the application of the reverse drive brake to the stop of the film is uniquely determined if the film feed velocity and the power supply battery when the reverse drive brake is applied are known. If it is shorter than the stop time, the film feed is not perfectly stopped, and if it is longer, the film is reversely fed after the stop.

By perfectly stopping the film feed by the reverse drive brake, there is no loss of force until the stop, and the film feed amount or the overrun amount from the application of the brake to the stop of the film is always constant in a number of experiments under the same condition.

Further, since the film feed velocity is related to the voltage of the power supply battery of the drive motor, the voltage of the power supply battery of the drive motor can be determined once the feed velocity is detected and the film may always be stopped with the constant feed amount.

Thus, in the stop by the reverse drive brake, the reverse drive braking times which causes a constant overrun amount at respective velocities are experimentarily determined and stored in a table (not shown) in the camera, and the reverse drive braking time is varied in accordance with the detected velocity based on the table.

As seen from FIG. 4, the overrun amounts at the respective feed velocities are concentrated to one point and an optimum reverse drive braking time is determined from the table in accordance with the feed velocity to attain the constant overrun amount.

A second embodiment of the present invention is now explained. As seen from FIG. 4, the overrun amount is concentrated to one point if the velocity is determined as described above, but it is effective only when the film feed velocity is low.

A measurement at a high speed is shown in FIG. 5.

It is seen that the overrun amount concentrated to one point at a low feed speed includes a variance when the feed velocity is high and exceeds V1. This is because the film is not completely stopped because of its inertia even if the motor completely stops.

In a recent camera, the film feed velocity is fairly high to cope with a continuous photo-taking. That is, the voltage of the power supply battery to drive the motor is fairly high. Thus, the first embodiment described above is not always effective. In the second embodiment, it is intended to make the film feed amount constant by the reverse drive brake when the film feed velocity is high.

In the present embodiment, when the feed velocity is high, the feed velocity is reduced to a velocity which causes no variance by the feed velocity control ( hereinafter duty drive ) as shown in FIG. 4 and then the reverse drive brake is applied.

A relation between the film feed amount and the film feed velocity when the film feed is controlled by the film feed device comprising a deceleration control unit which controls a length of the duty drive section and a reverse drive brake control unit which controls the reverse drive brake application time, is now explained with reference to FIG. 6.

In a graph a, when the film feed motor 1 is fully energized, acceleration occurs for a while (not shown) and the velocity then reaches a constant velocity Va and thereafter a steady state rotation is attained. When the feed amount reaches Sad, the motor 1 is duty-driven. Thus, the film feed is decelerated and the film velocity reaches Vas at the feed amount Ss.

At this moment, the reverse drive brake is applied to reversely drive the motor 1 so that the motor 1 is stopped. However, because of the inertia, it is not stopped instantly but it is stopped after the overrun Se-Ss.

A graph b shows a characteristic when the battery is depleted or the surrounding temperature is lowered. Since the steady state velocity Vb is lower than Va, the duty drive section may be short and hence the start point of the duty drive Sbd is later than Sad.

Since the duty drive is not to stop the motor but to decelerate the motor, the longer the duty drive section is, the more the film feed time is extended. In the present embodiment, since the duty drive section is short at the low velocity in which the film feed time is long, the extension of the film feed time is suppressed to a small value.

Accordingly, in order to conduct the film feed control in a most efficient way, it is necessary to determine a relation between the optimum length of the duty drive section to the film feed velocity (Va, Vb in FIG. 6) and the reverse drive braking time.

The relation experimentarily determined is shown in FIG. 7.

As seen from FIG. 7, when the film feed velocity is determined, the lengths of the duty drive section and the reverse drive braking time are uniquely determined.

This relation is inherent to an individual camera because of the load of gears and it may be introduced by an experiment.

In accordance with the present embodiment, there is no variation of the feed at the high velocity, as opposed to the first embodiment.

FIG. 8 shows a system block diagram of the feed device in the present embodiment.

Output signals from a power supply voltage detection unit 20, a photographed frame count detection unit 21, a velocity monitor unit 23 for detecting the film feed velocity and a film position detection unit 26 for detecting the film feed amount are supplied to a CPU 22 and processed thereby and a signal is outputted to a motor drive unit 24. The motor drive unit 24 powered by a power supply battery is connected to a motor 25 and drives the motor 25 (which corresponds to the motor 1 in FIG. 1) in accordance with the signal from the CPU 22. The rotation of the motor 25 is monitored by the velocity monitor unit 23.

An operation of the CPU 22 of FIG. 8 is explained with reference to a flow chart of FIG. 9.

In a step S1, an output signal from a shutter control unit (not shown) is received, and when the end of the shutter run is detected, the process proceeds to a step S2.

In step S2, a signal is outputted to the motor drive unit 24 to drive the motor 25 to feed the film, and the process proceeds to a step S3.

In the step S3, the output signal from the velocity monitor unit 23 is received to detect the film feed velocity, and the process proceeds to a step S4.

In the step S4, a duty drive start position and a reverse drive brake time are determined from the table stored in the CPU 22 and the process proceeds to a step S5.

In the step S5, the output signal from the film position detection unit 26 is received, and when it is detected that the film position has reached the duty drive start position determined in the step S4, an output signal indicating the start of the duty drive is outputted to the motor drive unit 24, and the process proceeds to a step S6.

In the step S6, a signal to duty-drive the motor 25 is outputted to the motor drive unit 24 and the process proceeds to a step S7.

In the step S7, the output signal from the film position detection unit 26 is received, and when it is detected that the film has been fed by one frame, a signal to start the reverse drive brake is outputted to the motor drive unit 24 and the process proceeds to a step S8.

In the step S8, a signal to apply the reverse brake to the motor 25 is outputted to the motor drive unit 24 and the process proceeds to a step S9.

In the step S9, when it is determined that the reverse drive braking time has reached the reverse drive braking time determined in the step S4, a signal to release the reverse drive brake is outputted to the motor drive unit 24 and the process is terminated.

In the present embodiment the feed control is effected by detecting only the film feed velocity, but where more accurate control is required, the following manner may be assumed.

As explained in the prior art device, the film feed velocity is determined by the voltage of the power supply battery and the number of photographed frames of the film (the diameter of the take-up spool).

Since the film feed velocity is substantially proportional to the voltage of the power supply battery, the accurate control is attained by merely detecting the film feed velocity as is done in the above embodiment when the change in the diameter of the take-up spool representing the number of photographed frames is small.

However, when the change in the diameter of the take-up spool representing the number of photographed frames is large, the voltage of the power supply battery is not proportional to the film feed velocity. In order to attain the accurate film feed even in such a case, in the film feed not only the film feed velocity is detected as it is in the above embodiment but also the voltage of the power supply battery is detected to determine the reverse drive braking time, or the number of photographed frames of the film is detected to determine the reverse drive braking time by adding the information of the number of photographed frames to the reverse drive braking time determined based on the film feed velocity. Specifically, when the number of photographed frames is large, the film feed velocity is high compared to the rotation speed of the motor so that the detected feed velocity is corrected toward minus. Since the correction amount differs depending on the number of photographed frames, the correction amount may be experimentally determined in accordance with the number of photographed frames.

Alternatively, a reference value of the feed velocity (a velocity which causes no variation in the overrun amount (V1 in FIG. 5)) may be set in the CPU and if the velocity is over the reference value, the film may be stopped by using both the duty drive and the reverse drive brake as it is in the second embodiment, and if it is lower than the reference value, the film may be stopped by using only the reverse drive brake as it is in the first embodiment.

In this manner, where the feed velocity is low and there is no variance in the overrun amount as shown in FIG. 4, the duty drive is not conducted and the drive time is not unduly extended.

In the present embodiment, the control is conducted by detecting the film feed velocity. Alternatively, the following method may be assumed.

As explained in the prior art device, the film feed velocity is determined by the voltage of the power-supply battery and the number of photographed frames of the film (the diameter of the take-up spool).

Accordingly, the voltage of the power supply battery and the number of photographed frames are detected and the film feed velocity is determined by the calculation based on both data and the film feed is controlled based thereon as it is in the above embodiment. In this manner not only the film feed amount is controlled more accurately as it is in the above embodiment but also the film feed amount may be controlled without a complex mechanism for monitoring the film feed velocity.

Where very accurate control is not required, the control may be attained by detecting only one of the voltage of the power supply voltage and the number of photographed frames of the film.

In accordance with the film feed device of the present invention, the film feed time is shortened and the film is always stopped at the constant position.

Further, the braking time is shortened even with a low price motor and the same order of feed time as that of a high price motor is provided. Accordingly, cost saving is attained.

What is claimed is:

1. A motor control device comprising:

an electric motor;

a speed detection circuit connected to said electric motor for detecting a motor speed of said electric motor;

a deceleration control circuit connected to said speed detection circuit for controlling deceleration of the motor by duty-driving said motor;

a reverse drive brake circuit for braking said motor by effecting reversal of a direction of electric current passing through said motor to bring said motor to a stop;

a storage circuit for storing control information regarding deceleration control and reverse drive control, said information varies based on a motor speed of said motor; and a brake control circuit for controlling said deceleration control circuit and said reverse drive brake circuit in accordance with the control information corresponding to the motor speed detected by said speed detection circuit.

2. A motor control device according to claim 1 wherein said brake control circuit controls only said reverse drive brake circuit in accordance with the control information to stop the motor when the motor speed detected by said speed detection circuit is no greater than a predetermined value, and controls said deceleration control circuit and said reverse drive brake circuit in accordance with the control information when the motor speed detected by said speed detection circuit is higher than the predetermined values.

3. A motor control device according to claim 1 further comprising a voltage detection circuit for detecting a voltage applied to said motor, wherein the control information further varies based on the voltage, and wherein said brake control circuit controls said deceleration control circuit and said reverse drive brake circuit in accordance with the control information corresponding to the motor speed detected by said speed detection circuit and the voltage detected by said voltage detection circuit.

4. A motor control device according to claim 3 wherein said control information includes information allowing said brake control circuit to change the time to decelerate the motor by said deceleration circuit in accordance with the voltage detected by said voltage detection circuit.

5. A film feed device comprising:

a motor which feeds a film;

a velocity detection circuit connected to said motor which detects a feed velocity of said film;

a voltage detection circuit which detects a voltage applied to said motor;

a deceleration control circuit, connected to said velocity detection circuit, and controls the deceleration of the film feed by duty-driving said motor;

a reverse drive brake circuit connected to said deceleration control circuit, and brakes said motor by effecting reversal of a direction of electric current passing through said motor to bring said film feed to a stop;

a storage circuit which stores control information regarding deceleration control and reverse drive control, said information varies based on the feed velocity of said film and the voltage applied to said motor; and a brake control circuit which controls said deceleration control circuit and said reverse drive brake circuit in accordance with the control information corresponding to the feed velocity detected by said velocity detection circuit and to the voltage detected by said voltage detection circuit.

6. A film feed device according to claim 5 further comprising a number of frames detection circuit which detects the number of photographed frames of the film, wherein the control information further varies based on the number of photographed frames of said film, and wherein said brake control circuit controls said deceleration control circuit and said reverse drive brake circuit in accordance with the control information corresponding to a result detected by said velocity detection circuit, to a result detected by said number of frames detection circuit and to a result detected by said voltage detection circuit.

7. A film feed device according to claim 6, wherein a velocity detected by said velocity detection circuit is decreased when the number of photographed frames of the film detected by said number of frames detection circuit is large.

* * * * *